United States Patent
Gal et al.

(10) Patent No.: US 9,749,161 B1
(45) Date of Patent: Aug. 29, 2017

(54) FIXED-POINT CONJUGATE GRADIENT DIGITAL PRE-DISTORTION (DPD) ADAPTATION

(71) Applicant: Freescale Semiconductor, Inc., Austin, TX (US)

(72) Inventors: Avraham D. Gal, Ra'anana (IL); Roi M. Shor, Tel Aviv (IL); Igor Levakov, Kfar Saba (IL)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/051,120

(22) Filed: Feb. 23, 2016

(51) Int. Cl.
H04B 1/62 (2006.01)
H04L 25/03 (2006.01)
H04B 1/04 (2006.01)

(52) U.S. Cl.
CPC ..... H04L 25/03885 (2013.01); H04B 1/0475 (2013.01); H04L 25/03057 (2013.01); *H04B 2001/0425* (2013.01); *H04L 2025/03681* (2013.01)

(58) Field of Classification Search
CPC .......... H04B 1/0475; H04B 2001/0425; H04L 25/03057; H04L 25/03885; H03F 1/3247; H03F 2201/3224; H03F 2201/3231; G06F 17/16
See application file for complete search history.

(56) References Cited

U.S. PATENT DOCUMENTS

| 8,121,560 | B1 | 2/2012 | Anaraki et al. | |
| 8,706,062 | B1 | 4/2014 | Yu et al. | |
| 2006/0067424 | A1* | 3/2006 | Wolf | H04L 27/364 375/296 |
| 2006/0133536 | A1* | 6/2006 | Rexberg | H03F 1/3258 375/297 |
| 2010/0293213 | A1* | 11/2010 | Jiang | G06F 17/17 708/270 |
| 2011/0135034 | A1 | 6/2011 | Mujica et al. | |
| 2011/0320768 | A1* | 12/2011 | Pell | G06F 12/16 712/30 |

(Continued)

OTHER PUBLICATIONS

Hong Jiang, Xin Yu, and Paul A. Wilford, "Digital Predistortion Using Stochastic Conjugate Gradient Method", Alcatel-Lucent, IEEE Transactions on Broadcasting, vol. 58, No. 1, Mar. 2012.*

(Continued)

*Primary Examiner* — Aristocratis Fotakis (57) ABSTRACT

A predistortion method and apparatus are provided which use a DPD actuator (225) to apply a memory polynomial formed with first DPD coefficients to a first input signal x[n], thereby generating a first pre-distorted input signal y[n] which is provided to the non-linear electronic device (253) to produce the output signal, where the memory polynomial may be adaptively modified with a digital predistortion adapter (224) which computes second DPD coefficients u[n] with an iterative fixed-point conjugate gradient method which uses N received digital samples of the first pre-distorted input signal y[n] and a feedback signal z[n] captured from the output signal to process a set of conjugate gradient parameters (u, b, v, r, ω, α, β) at each predetermined interval, thereby updating the first DPD coefficients with the second DPD coefficients u[n] generate a second pre-distorted input signal which is provided to the non-linear electronic device.

18 Claims, 5 Drawing Sheets

(56) References Cited

U.S. PATENT DOCUMENTS

| | | | |
|---|---|---|---|
| 2012/0098596 A1* | 4/2012 | Nagatani | H03F 1/3247 330/149 |
| 2014/0086361 A1* | 3/2014 | Azadet | H04L 1/0054 375/297 |
| 2015/0293882 A1* | 10/2015 | Angerer | G06F 17/12 708/446 |
| 2015/0381216 A1 | 12/2015 | Shor et al. | |
| 2015/0381220 A1* | 12/2015 | Gal | H04B 1/0475 375/296 |
| 2016/0126903 A1* | 5/2016 | Abdelrahman | H04B 1/0475 330/149 |

OTHER PUBLICATIONS

Namrata Dwivedi et al., Fixed Point Digital Predistortion System based on Indirect Learning Architecture, 2014 International Conference on Advances in Computing, Communications and Informatics (ICACCI), 5 pages.

Hong Jiang et al., Digital Predistortion Using Stochastic Conjugate Gradient Method, IEEE Transactions on Broadcasting, vol. 58, No. 1, Mar. 2012, 11 pages.

Roi M. Shor et al., U.S. Appl. No. 14/752,574, filed Jun. 27, 2014, entitled Adaptive High-Order Nonlinear Function Approximation Using Time-Domain Volterra Series to Provide Flexible High Performance Digital Pre-Distortion.

* cited by examiner

(A[n]) from a first delay line that holds the last K absolute values of the input complex samples (x[n]) and also receives complex sample values from a second delay line that holds the last K input complex samples (x[n]). In addition, each of Q identical basic predisorter cells includes an N-line lookup table (LUT) which performs linear interpolation between LUT values to decrease quantization error. In order to efficient adapt the digital predistortion actuator to track the performance of the power amplifier, the LUTs in the BPCs should be updated converting the DPD coefficients to LUTs. Using the product of one or more absolute sample values to index into the LUT, the resulting LUT outputs provide product terms (e.g., β*A[n−k]) which are multiplied with additional absolute sample values (e.g., A[n−l]) and/or complex sample values (e.g., x[n−k]) using a combination of multiplier and multiplexer hardware circuits so that the output of each cell may be combined at an adder circuit to generate the sum. For example, a pair of input multiplexers is used to multiply first and second absolute sample values at a first stage multiplier circuit, with the product being multiplexed at a first stage multiplexer along with an absolute sample value from one of the input multiplexers. The selected output from the first stage multiplexer is supplied as an index to the LUT with linear interpolation, and the resulting LUT output may be multiplied with another absolute sample value at a second stage multiplier. At a third stage multiplier, the selected output from the second stage multiplexer is multiplied with a complex sample value, and the resulting product is then multiplexed at an output multiplexer along with a "0" value to provide a first output term. With the "0" input selected, the BPC is disabled to save power. In this way, different output terms from different predisorter cells may be combined or added at a shared adder circuit. In addition, multiple BPCs can be cascaded in various ways to produce higher order Volterra terms of different cross-term structure. By computing power series terms using look-up tables, a high throughput, flexible and power efficient digital predistorter hardware implementation is provided which has a smaller device area, lower power consumption, and minimal or zero impact on DPD linearization performance. In selected embodiments, a single chip digital front end processor at a base station performs digital pre-distortion on a composite multi-carrier waveform by using integrated predisorter hardware cells to perform Volterra's processing algorithm to calculate polynomial values from a complex input vector. However, it will be appreciated that the digital predistortion functionality provided is not constrained to a specific mathematical model, such as Volterra, since the LUT can represent any form of function, not only a power series model.

Figure 1:
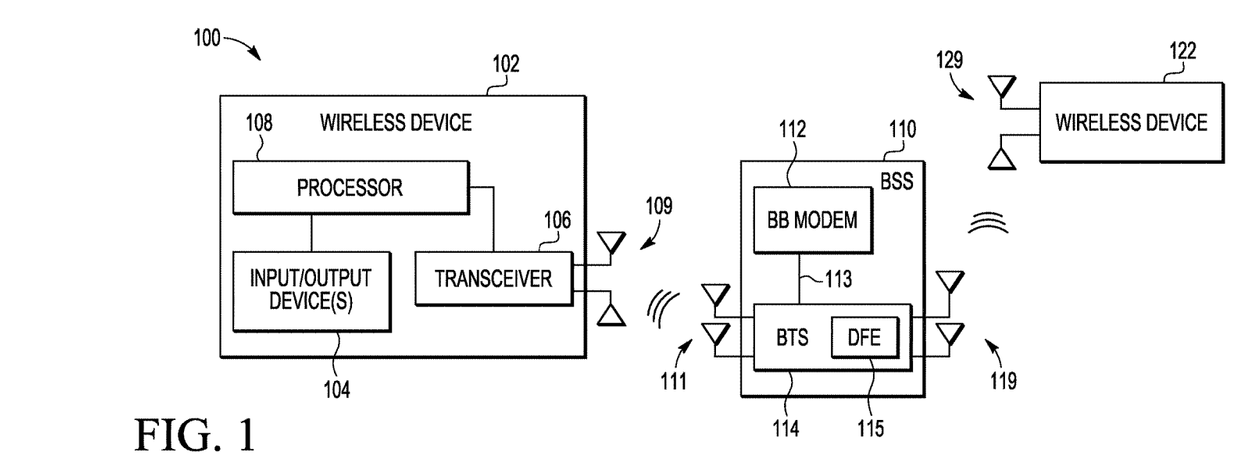

To provide a contextual understanding for selected embodiments of the present disclosure, reference is now made to FIG. 1 which shows a simplified block diagram of a wireless communication system 100 having digital front end (DFE) modules at one or more multi-antenna system nodes for wirelessly transmitting and receiving signals. The depicted wireless communication system 100 includes a plurality of wireless devices or subscriber stations 102, 122 (e.g., hand-held computers, personal digital assistants (PDAs), cellular telephones, etc.) that wirelessly communicate with one or more base station systems (BSS) 110 (e.g., enhanced Node-B or eNB devices). Each wireless devices (e.g., 102) may include a processor 108 (e.g., a digital signal processor), a transceiver 106 connected to one or more antennas 109, and one or more input/output devices 104 (e.g., a camera, a keypad, display, etc.), along with other components (not shown). The wireless devices 102, 122 use attached antennas 109, 129 to wirelessly communicate with the base station system (BSS) 110 via antennas 111, 119 to receive or transmit voice, data, or both voice and data.

In the depicted arrangement, the base station system 110 is deployed with a plurality of radio base station subsystems or nodes, including a baseband modem 112 (e.g., radio equipment control device) and at least one base transceiver station (BTS) 114 connected to one or more antennas 111, 119 to function as a radio equipment device. In the illustrated topology, the baseband modem 112 is connected over a network link 113 (e.g., CPRI link) to a first BTS 114.

In the embodiments shown, the base transceiver station 114 includes a digital front end (DFE) processor 115 which may be implemented as a single integrated circuit to provide the digital components of the cellular base station RF subsystem. The digital components consolidated on each DFE 115 may include one or more control processors and digital transmit/receive filters, as well as interface peripherals and other I/O for RF subsystem functions. In addition and as described more fully below, each DFE 115 may include a transmit processing path for each antenna which performs signal processing on the transmit signal, including digital pre-distortion processing on received baseband signal samples to overcome power amplifier non-linear operation (a.k.a. distortion). The DPD-processed transmit signal is then provided to a power amplifier and associated antenna, thereby forming a separate DFE-power amplifier chain for each transmit antenna. As will be appreciated, the DPD processing techniques disclosed herein with reference to the base station system 110 may also be used in connection with a multi-antenna wireless communication device, such as the wireless devices 102, 122. To this end, each wireless device 102, 122 may also include a digital front end (DFE) processor or equivalent circuitry connected to a corresponding transceiver unit which includes a transmit processing path for each antenna which performs signal processing on the transmit signal.

Figure 2:
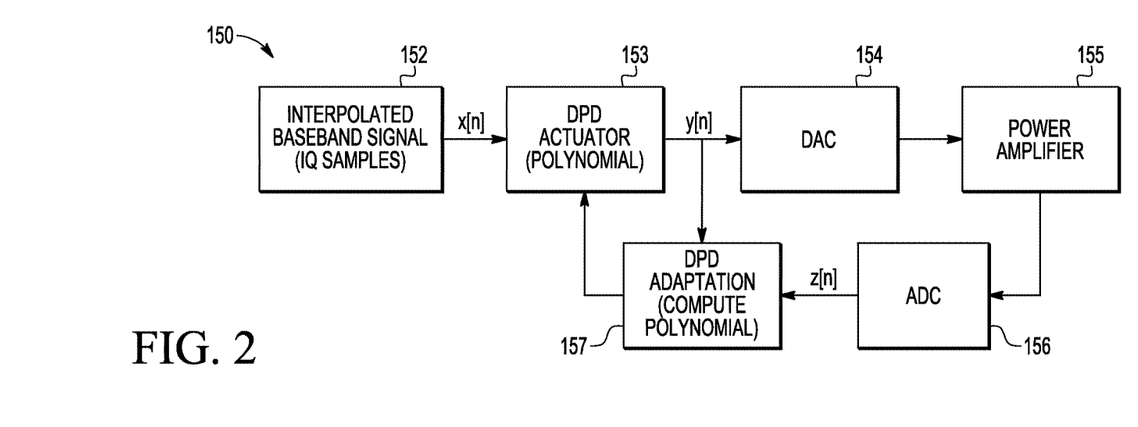

Applicants have determined that a need exists for improved digital pre-distortion processing operations in wireless communication systems (such as 3G, 4G and future generations of systems) on the transmit side to overcome the problems in the art, such as outlined above, though further limitations and disadvantages of conventional technologies will become apparent to one of skill in the art after reviewing the remainder of the present application. For example, reference is now made to FIG. 2 which depicts a simplified block diagram of a digital baseband predistortion communication transmitter 150 which processes received interpolated samples 152 at a digital predistortion actuator 153 for RF conversion at the digital-to-analog converter 154 and power amplification at RF power amplifier (PA) 155 for transmission by a corresponding antenna (not shown). While there are DPD actuator solutions which use algorithms based on Volterra modeling of the inverse operation of power amplifier, such solutions are typically quite complex, and utilize software-based actuators or hardware-based actuators which provide only limited support for adaptively computing memory polynomial terms with updated DPD coefficients in order to track changes in the power amplifier caused by changing conditions (e.g., time, temperature, memory effects, etc.). For example, there are many well-known algorithms for indirect DPD-adaptation, including sample-based algorithms (such as floating-point recursive least squares (RLS) methods or fixed-point least mean squares (LMS) methods) and block-based algorithms (such as floating-point or fixed point least squares method (e.g., modified Gram-Schmidt or MGS)). With existing sample-based algorithms (e.g., RLS or RMS), there are high mega cycles per second (MCPS) requirements with long adaptation times. And while existing block-based algorithms have lower MCPS by virtue of being lower complexity methods, the floating-point implementations used to achieve increase accuracy and performance require larger circuit areas and more computational resources.

In this disclosure, Applicant has provided an improved system, apparatus, and method for adaptively evaluating a polynomial against one or more complex input vectors by providing a low complexity, high precision fixed-point conjugate gradient DPD adapter to iteratively update or adapt the memory polynomial coefficients used by a DPD actuator having cascaded DPD actuator hardware cells to support computation of Volterra series memory polynomial terms and cross terms of type 1, 2 and 3 based on look-up table (LUT) implementation. The provided solution solves various problems in the art where various limitations and disadvantages of conventional solutions and technologies will become apparent to one of skill in the art after reviewing the remainder of the present application. Some of these advantages include reduced adaptation times, improved precision, smaller chips area, fewer computation resources, reduced complexity, scalability of performance, improved versatility, and/or simplified implementation. Scalability is enabled by the way that each SoC can decide the number of required BPCs based on performance requirements. Versatility is provided while fully re-using a re-configured version of the existing hardware by re-arranging the interconnections among the BPCs. A common, small, and efficient BPC building block can not only be readily re-used, but also the advantage of simpler verification/validation, and overall effort of implementation.

Figure 3:
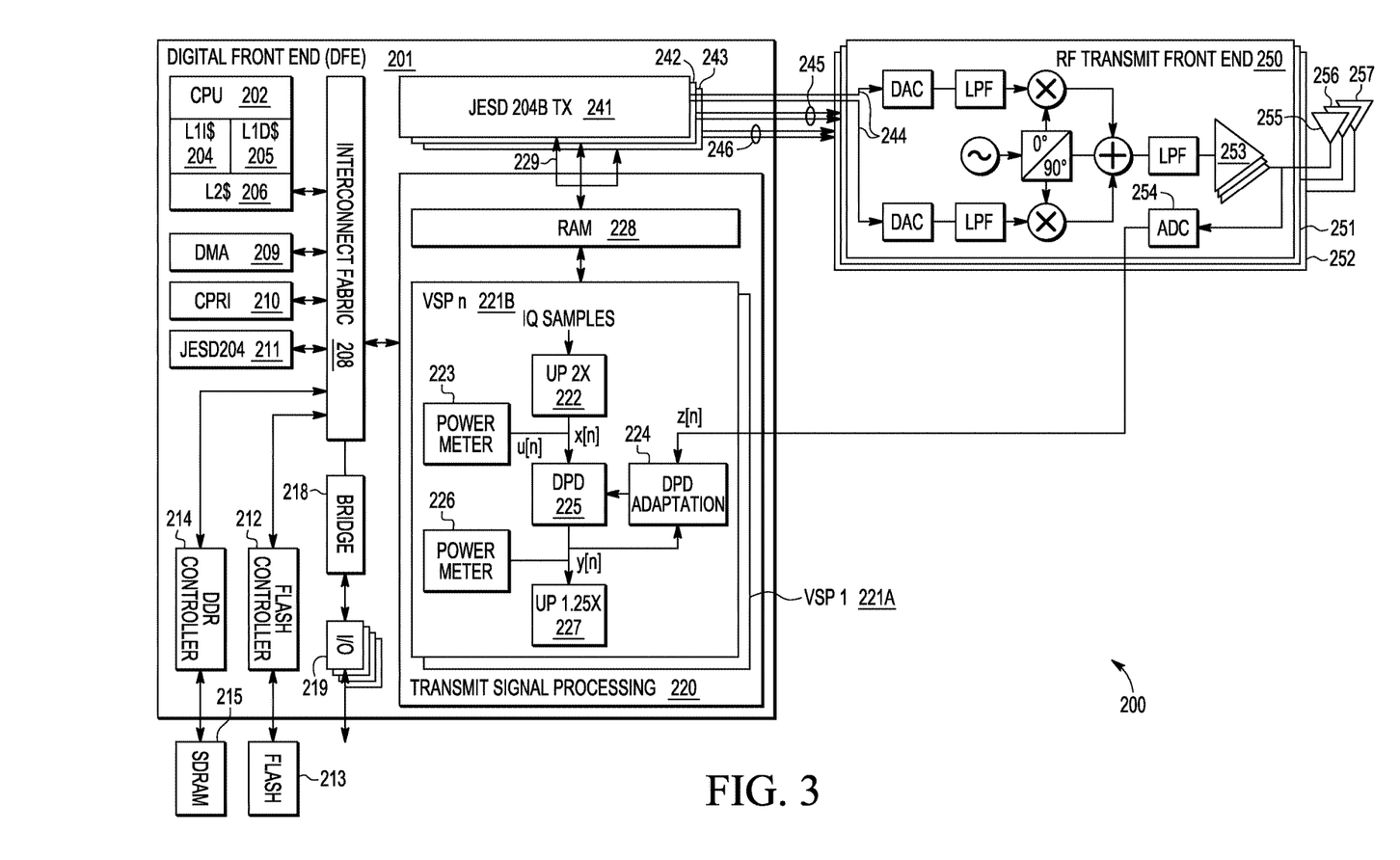

To illustrate selected embodiments of the present system, apparatus, and method for DPD adaption, reference is now made to FIG. 3 which depicts a high level architecture block diagram illustration of a multi-antenna radio frequency (RF) base station subsystem 200 which performs pre-distortion with fixed-point conjugate gradient DPD adaptation using a plurality of LUT-based basic predistortion hardware cells to efficiently evaluate Volterra series memory polynomial terms and higher order cross terms (e.g., type 1, 2 and 3) from the same input vector. The RF base station subsystem 200 is connected to a base station controller (not shown), and includes a single chip digital front end (DFE) processor 201 connected over one or more RF transmit front end circuits 250-252 to one or more antennas 255-257, respectively. As will be appreciated, a radio receiver front end may be understood to refer to all circuitry between the antenna and the first intermediate frequency (IF) stage, including analog and digital receiver components that process the signal at the original incoming radio frequency (RF) before it is converted to an intermediate frequency (IF). In this arrangement, the digital front end (DFE) processor 201 may be located in a radio head that is co-located with the base station controller, or may be located at a remote radio head that is not co-located with the base station controller. For simplicity of illustration, the transmit antennas 255-257 are shown as being connected to the respective transmit front end circuits 250-252, but it will be appreciated that the transmit antennas 255-257 may be shared for both signal transmission and reception in a shared or switched circuit arrangement.

Connected to each transmit antenna (e.g., 255) is an RF transmit front end circuit (e.g., 250) which includes RF conversion circuit components (e.g., digital-to-analog converters, low pass filters, oscillators, splitters, mixers, amplifiers, etc.) for converting and filtering the digital I and Q samples 244 output by the DFE processor 201 to a combined analog signal that is filtered and amplified (e.g., with one or more RF power amplifiers 253) for transmission by a corresponding antenna (e.g., 255). In addition, each RF transmit front end circuit includes an analog-to-digital converter 254 which is coupled to capture the amplified output transmit signal from the power amplifier 253 for feedback as the digitized complex samples of the transmit signal $z[n]$. Though the RF front end circuits (e.g., 250) employ the depicted RF conversion and power amplifier circuit components, it will be appreciated that other RF conversion circuit arrangements and power amplifier components can be used.

The digital front end (DFE) processor 201 is provided to perform digital signal processing for the RF base station subsystem 200 across the separate transmit antennas 255-257. To this end, the DFE processor 201 partitions transmit signals to the antennas into transmit processing paths, and communicates with the baseband modem through the Common Public Radio Interface (CPRI) interface 210, JESD204A/B interface 211, and/or other protocol. The DFE processor 201 may include one or more control processors 202 (e.g., one or more processor cores), memory subsystems (e.g., L1 instruction cache 204, L1 data cache 205, L2 cache 206), memory controllers (e.g., DMA controller 209, flash controller 212, and DDR controller 214) for interfacing with external memory (e.g., Flash memory 213, SDRAM 215), one or more modem interfaces (e.g., CPRI interface 210 and JESD204A/B interface 211), and I/O facilities (e.g., host bridge 218) for I/O devices 219. As a general matter, any of a variety of memory designs and hierarchies may be employed in, or in conjunction with, with the DFE processor 201. Also, it will be appreciated that the I/O devices 219 may include any desired I/O device, such as Ethernet, I2C, SPI, GPIO, and/or UART devices. All processor subsystems are linked by a multi-level interconnect fabric 208.

To digitally process transmit signals, the DFE processor 201 may also include a programmable transmit signal processing path for each transmit antenna 255-257 which is formed with a transmit signal processor 220 and an associated serialized interface 241-243 (e.g., a JESD204B TX interface) and RF transmit front end 250-252. The transmit signal processor 220 may include one or more processors 221A, 221B (e.g., vector signal processors VSP1 and VSPn) and associated memory 228 (e.g., RAM) for performing carrier-related signal processing and antenna-specific processing on IQ samples received from the baseband modem. Signal processing along each transmit signal path may be divided between the processors 221A, 221B and shared memory 228. For example, a first vector signal processor 221A (VSP 1) may be used to scale, filter, interpolate, up-sample, and combine multiple carriers into a composite carrier, and then perform crest factor reduction (CFR) on the composite carrier. After crest factor reduction, the CFR-processed signal may be transferred to the shared RAM 228. At this point, a second vector signal processor 221B (VSP n) may be used to perform dynamic pre-distortion, DPD adaptation, interpolation, and/or other signal processing on the output IQ samples retrieved from shared memory 228. For example, retrieved IQ samples from shared RAM 228 are stored in an internal VSP buffer (not shown), up-sampled by interpolator 222 (e.g., by 2×), measured with a first power meter 223, processed through the DPD module 225 and DPD adaptation module 224, measured with a second power meter 226, and then up-sampled by interpolator 227 (e.g., by 1.25×) to a final sample rate for storage in the internal VSP buffer (not shown). The power meters 223, 226 are used to monitor the power profile of the transmit signal. Once signal processing is completed, the transmit signal processor 220 may send the processed samples over a signal/buss line 229 to an associated serialized interface (e.g., JESD204B TX 241) for transfer to the transceiver (e.g., 250) over IQ signal lines 244. In this way, a first antenna path is formed by the connection of the transmit signal processor 220 and JESD204B TX interface 241 which are connected over IQ signal lines 244 to transceiver 250 and antenna 255, a second antenna path is formed by the connection of the transmit signal processor 220 and JESD204B TX interface 242 which are connected over IQ signal lines 245 to transceiver 251 and antenna 254, and a third antenna path is formed by the connection of the transmit signal processor 220 and JESD204B TX interface 243 which are connected over IQ signal lines 246 to transceiver 252 and antenna 255.

With each transmit signal path between the DFE processor 201 and antennas 255-257, the output signal (e.g., 244) provided to the RF transmit front end (e.g., 250) is amplified by RF power amplifier circuitry (e.g., 253) which can generate out-of-band spurious emissions or otherwise add non-linear distortion to the amplified signal. To maintain linear operation and prevent or reduce distortion, digital pre-distortion (DPD) systems are used to compensate for the intrinsic distortion characteristics of non-linear power amplifier devices. Pre-distortion in the baseband domain is performed by creating a function 'G' that acts upon the signal x[n] prior to power amplification that has transfer function 'H', so when the pre-distorted version of x[n], called y[n], is inserted to the power amplifier (e.g., 253), the overall power amplifier output is linear (or at least, less non-linear). There are a variety of techniques for generating the predistortion function, such as using mathematical models to represent the power amplifier and computing an inverse of the model or using curve-fitting methods (e.g., Secant, Newton's Discrete method, and the like) to adapt the function 'G' such that H*y[n]=~g*x[n], where g is the amplifier gain. However, there is a significant processing complexity and other costs associated with implementing such DPD algorithms, such as the substantial digital processing required to adaptively evaluate the complex polynomial models of the power amplifier.

One approach for implementing digital predistortion system is to connect the DPD actuator module 225 and DPD adaptation module 224 in a digital predistortion system in which the DPD actuator module 225 applies a predistortion function to x[n], the received complex samples of the input baseband signal in the time domain (where n is the time sample index), thereby generating y[n], the pre-distorted complex samples. The DPD adaptation module 224 updates the memory polynomial coefficients u[n] in the DPD actuator module 225 based on the comparison of the input baseband signal x[n] and z[n] (the digitized complex samples of the signal output from the RF high power amplifier (HPA) 253 captured by the ADC 254) to provide an indirect learning method for implementing digital pre-distortion by modelling the DPD actuator 225 with a Volterra sequence. In this approach, the processing of the RF transmit front end 250 (alone or in combination with a feedback analog-to-digital converter 254) is combined into an HPA transfer function y[n]=F(z[n]), the inverse of which is approximated by a memory polynomial that is computed at the DPD adapter 224 using the samples y[n] (generated by the DPD module 225) and z[n] (captured from the RF transmit front end 250). Then, the computed memory polynomial coefficients u[n] from the DPD adapter 224 are used at the DPD predistorter 225 which computes the predistorted signal y[n] from the original input signal x[n].

In order to find an approximation of the inverse of HPA transfer function F, the DPD actuator module 225 is configured to evaluate a memory polynomial function $\Sigma_{q=1}^{Q} z_{n-q+1} \Sigma_{i=0}^{M-1} u_{qi}\phi_i(|z_{n-q+1}|)$, where $\{\phi_0, \ldots, \phi_{M-1}\}$ forms a basis of polynomials, and where $u_{qi}$ are complex coefficients. To compute the memory polynomial coefficients $u_{qi}$ that best approximates the inverse of the HPA transfer function, the DPD adapter module 224 computes the coefficients $u_{qi}$ that minimize the mean square error (MSE) in the equation $y_n - \Sigma_{q=1}^{Q} z_{n-q+1} \Sigma_{i=0}^{M-1} u_{qi}\phi_i(|z_{n-q+1}|)$. Stated another way, the coefficients $u_{qi}$ are computed which satisfy the normal equation Au=b, where A is the QM×QM covariance matrix, u is a vector of complex QM-tuplets representing the coefficients $u_{qi}$ and b is also a vector of QM tuplets whose components are given by $b_{qi}=E((Z_q\phi_i)Y)$, $q=1, \ldots Q, i=0, \ldots M-1$, with E defined as the expected value of a random variable, Y defined as the random variable from which the samples $y_n$ are drawn, and $Z_q$ defined as the random variable from which the samples $z_{n-q+1}$ are drawn. The DPD actuator module 224 may apply any desired algorithm to compute the polynomial coefficients $u_{qi}$ that solve the normal equation, Au=b, such as recursive least squares (RLS), least mean squares (LMS), modified Gram-Schmidt (MGS), or conjugate gradient (CG) methods.

Figure 4:
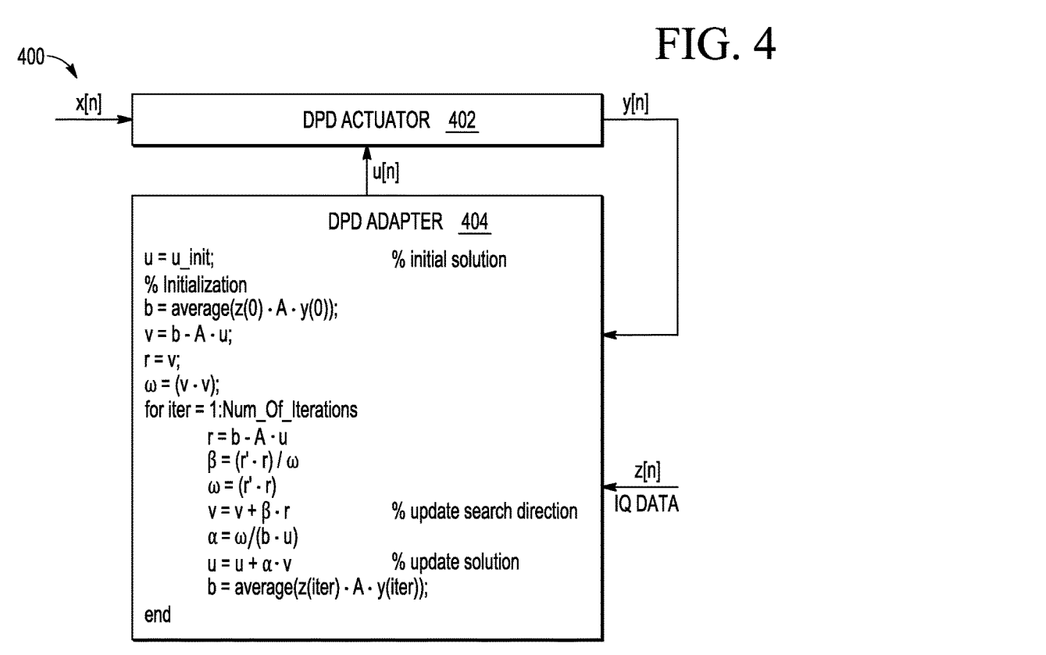

For example, FIG. 4 schematically illustrates a digital predistortion system 400 in which a DPD adapter 404 generates pre-distorted complex samples of a transmit signal y[n] from the complex samples of the input baseband signal x[n] under control of the DPD adapter module 404 which uses a floating-point conjugate gradient DPD adaptation method to iteratively compute polynomial coefficients u[n] supplied to the DPD actuator 402. As depicted, the DPD adapter 404 executes or embodies control code functionality which implements an inner-outer loop, where each iteration of the outer loop takes a set of samples from the input y[n] and output z[n] of the power amplifier and forms the normal equations with the samples, and where each iteration of the inner loop solves the normal equation Au=b to derive u, the vector of complex QM-tuplets representing the coefficients $u_{qi}$. The depicted code functionality of the DPD adaptation process 404 defines an initial solution (u=u_init) and initializes selected computational CG parameters, including an initial output value b=average(z(0)·A·y(0)), an initial search direction value v=b−A·u, an initial residual value r=v, and an initial residual magnitude value ω=(v'·v), where the syntactical expression v'=ctranspose(v) refers to the complex conjugate transpose of v. Stated more generally, A' computes the complex conjugate transpose of A. Then, updated values are iteratively calculated for the residual value r=b−A·u, search direction value v=v+β·r, and coefficients u=u+a·v by evaluating the basis functions at the power amplifier's input y[n] and output z[n] samples using the scalar CG parameters α=ω/(b·u), β=(r'·r)/ω), ω=(r'·r), and b=average (z(iter)·A·y(iter)) through an iterative computational loop which terminates when either when the norm of the residual r is small, or when the maximum number of iterations is performed (which is equal to the dimension of the solution vector, QM). Unfortunately, the CG parameters, such as the scalar values α, β used in the control code functionality of the DPD adapter 404, do not converge within a range that is suitable for fixed-point arithmetic which requires a relatively small low dynamic range that converges to a fixed point. As a consequence, the depicted code functionality of the DPD adaptation process 404 is implemented with as a floating-point algorithm which provides good accuracy and higher performance, but at the cost of requiring larger, more complex circuits. In addition, the control code functionality of the DPD adapter 404 requires resampling at every block (i.e. 66.7 us), which causes higher system complexity and consumption of processing resources.

Figure 5:
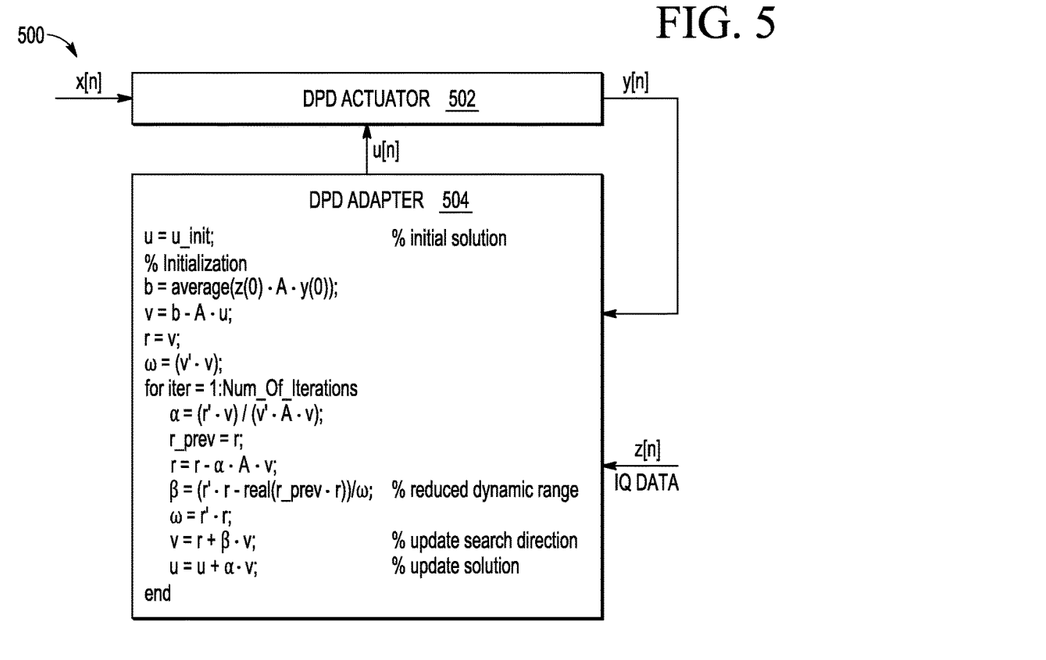

To address some of the shortcomings associated with existing solutions, reference is now made to FIG. 5 which schematically illustrates a digital predistortion system 500 in which a DPD adapter 502 generates pre-distorted complex samples of a transmit signal y[n] from the complex samples of the input baseband signal x[n] under control of the DPD adapter module 504 which uses a fixed-point conjugate gradient DPD adaptation method to iteratively compute polynomial coefficients u[n] supplied to the DPD actuator 502. In a setup sequence, the DPD adapter 504 executes or embodies control code functionality to specify or define an initial solution (u=u_init) and to initialize selected computational CG parameters, including an initial output value b=average(z(0)·A·y(0)), an initial search direction value v=b−A·u, an initial residual value r=v, and an initial residual magnitude value ω=v'·v. To enable the implementation of a fixed-point solution to the DPD adaptation process 504, the residual value r, search direction value v, and coefficients u are computed through an iterative computational loop which terminates when either when the norm of the residual r is small, or when the maximum number of iterations is performed (which is equal to the dimension of the solution vector, QM). By using modified equations in the iterative loop for the scalar CG parameters α, β, the residual value r, search direction value v, and updated memory coefficient solution value u are computed. In particular, the scalar CG parameter α is computed as α=(r'·v)/(v'·A·v), the previous residual value r_prev is computed as r_prev=r, the updated residual value r is computed as r=r−α·A·v, the scalar CG parameter β is computed as β=(r'·r−real(r_prev'·r))/ω, the updated residual magnitude value ω is computed as ω=r'·r, the updated search direction value v is computed as v=r+β·v, and the updated memory coefficient solution value u is computed as u=u+α·v. With the modified equations, the computational CG parameters α, β have a decreased or smaller dynamic range that is suitable for a fixed-point DSP implementation or a hardware-based solution, such as a DPD adaption acceleration circuit or FPGA solution because the majority of operations involved are vector inner products. In addition, each iteration of the depicted code functionality of the DPD adaptation process 504 uses the same N samples of the power amplifier's input y[n] and output z[n] samples, meaning that resampling may be done at each frame (e.g., every 10 ms) instead of at every block (e.g., 66.7 μs).

By providing a fixed-point conjugate gradient DPD adaptation solution, there are a number of practical advantages in comparison to existing floating point solutions. For example, fixed-point chip sizes are typically smaller and consume less power since the logic circuits of fixed-point hardware is less complicated than those of floating-point hardware. In addition, calculations in fixed-point solutions typically require less memory and less processor time to perform. And when digital hardware is used in a product, such as mass-produced products, fixed-point hardware costs are usually lower than floating point hardware costs, resulting in significant savings. Thus, the performance metrics, such as cost, ease of use, and area requirements, are all advantages for fixed-point processor solutions used with high volume general purpose applications.

In addition to providing a conjugate gradient DPD adaptation solution that may be efficiently implemented with a fixed-point DSP solution, selected embodiments of the present disclosure may be implemented by connecting a plurality of predistorter hardware cells into a cascaded arrangement to provide cross-term (CT) and cascading capabilities, thus reducing the cost and complexity of hardware required for DPD adaptation. For example, reference is now made to FIG. 6 which depicts a simplified block diagram illustration of a digital predistorter actuator module 600 which may be used in place of the DPD adaptation module 224 and the DPD module 225 shown in FIG. 3. As depicted, the DPD actuator 600 includes a plurality of basic predistorter cells (BPC) 601-603 integrated in digital hardware which are connected and combined to evaluate higher order Volterra terms under control of the DPD adapter module 610 which converts computed polynomial coefficients into LUTs at each BPC. In this example embodiment, the predistortion function generated by the DPD actuator 601 is based on a Generic Volterra Series Approximation (GVSA) model of a power amplifier by defining a complex polynomial with a set of complex polynomial filtering coefficients $\{\beta_k, k=[0:K-1]\}$ in a functional power series in which y[n] is computed as the sum of the memory polynomial terms (e.g., $\Sigma\Sigma\beta_k^* A[n-k]^P * x[n-k]$), type 1 cross terms (e.g., $\Sigma\Sigma\beta_k^* A[n-k]^P * x[n-l_1] + \ldots + \Sigma\Sigma\beta k^* A[n-k]^P * x[n-l_Q]$), first order type 2 cross terms ($\Sigma\Sigma\beta k^* A[n-k]^P * A[n-l_1]^* x[n-m_1] + \ldots + \Sigma\Sigma\beta_k^* A[n-k]^P * A[n-l_Q]^* x[n-m_Q]$), second order type 2 cross terms ($\Sigma\Sigma\beta_k^* A[n-k]^P * A[n-l_1]^* A[n-m_1]^* x[n-r_1] + \ldots + \Sigma\Sigma\beta_k^* A[n-k]^P * A[n-l_Q]^* A[n-m_Q]^* x[n-r_Q]$), first order type 3 cross terms ($\Sigma\Sigma\beta_k^* A[n-k]^P * A[n-l_1]^P * A[n-m_1]^* x[n-r_1] + \ldots + \Sigma\Sigma\beta_k^* A[n-k]^P * A[n-l_Q]^P * A[n-m_Q]^* x[n-r_Q]$), and second order type 3 cross terms ($\Sigma\Sigma\beta k^* A[n-k]^P * A[n-l_1]^S * A[n-m_1]^* x[n-r_1] + \ldots + \Sigma\Sigma\beta_k^* A[n-k]^P * A[n-l_Q]^S * A[n-m_Q]^* x[n-r_Q]$). The order of the term—such as $1^{st}$ order, $2^{nd}$ order, etc.—refers to the dynamicity of the model, and determines the number of terms (in addition to the main term) that take part in any cross-correlation computation between samples from more than one time point to account for memory effects. In the GVSA example, y[n] is the DPD output (IQ complex sample) and x[n] is the DPD input (IQ complex sample). In addition, A[n] is the real-valued amplitude of the DPD input (e.g., abs(x[n])), $\beta_k$ is the coefficient of the filtering, and P is the order of the polynomial degree. The double integral function $\Sigma\Sigma$ runs over k=[0:K−1], p=[0:P−1] and/or s=[0:S−1]. In addition, the terms $l_q$, $m_q$, $r_q$ are constant delays for each basic predistorter hardware cells 601-603 (total number of offsets=Q).

As will be appreciated, computation of the power series terms y[n], such as the GVSA example, can be done either directly or using lookup-tables. With direct implementation, the DPD function would require a large number of multiplications to construct the nonlinear and memory terms, and this number increases significantly with K, P, S and Q. As a result, existing DPD solutions have embodied only partial computations of the GVSA equation, generating only the memory polynomial terms and basic type 1 cross terms. In contrast, lookup-tables implementations are much more efficient (e.g., 5× more efficient) in device area, resulting in reduced power consumption with minimal or no impact on DPD linearization performance.

Figure 6:
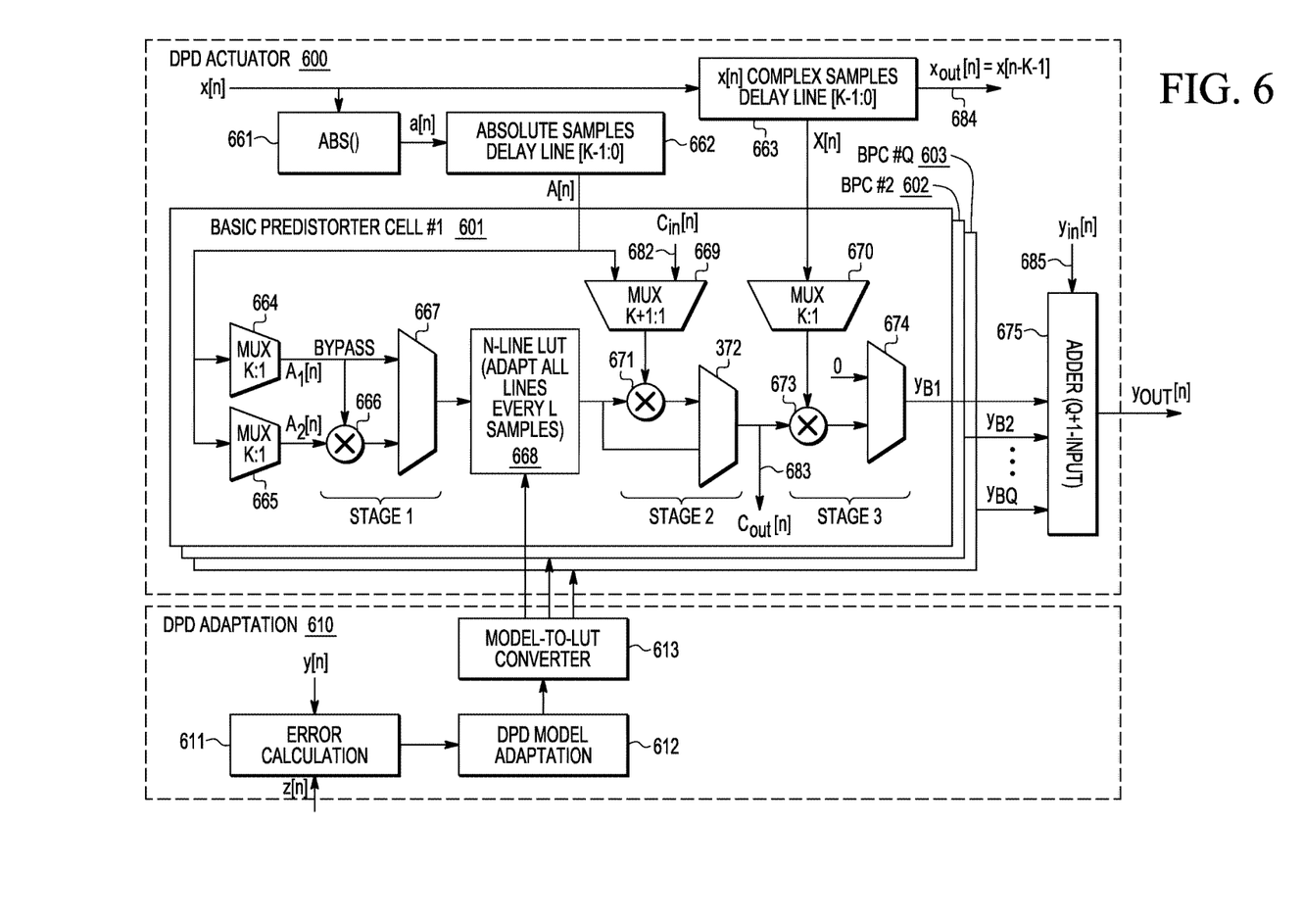

In accordance with selected embodiments of the present disclosure, the DPD actuator module 600 is provided for efficiently evaluating a complex polynomial y[n] by using a plurality of basic predistorter hardware cells 601-603 to generate q different Volterra terms (e.g., $y_{B1}, y_{B2}, \ldots y_{BQ}$) of a complex polynomial of order P based on N complex input values (e.g., $x[n]=(x_0, x_1, \ldots x_N)$). The main components of the depicted DPD actuator module 600 include a first vector magnitude computation unit 661, a first delay line 662 for holding K−1:0 absolute samples, a second delay line 663 for holding K−1:0 complex samples, and a plurality of basic predistorter hardware cells 601-603. The first vector magnitude computation unit 661 computes, generates or retrieves the absolute value or vector magnitude ABS( ) for the input data samples x[n]. The first delay line 662 holds the last M (e.g., M=32) absolute values of the input complex samples x[n] received from the first vector magnitude computation unit 661. The second delay line 663 holds the last M (e.g., M=32) input complex samples x[n]. The plurality of basic predistorter hardware cells 601-603 may be embodied as Q (e.g., Q=8) identical basic predistorter hardware cell units, where each basic predistorter hardware cell (e.g., 601) includes a multi-stage multiply and accumulate hardware or firmware structure including a pair of input multiplexers 664, 665, a first stage multiplier 666 and multiplexer 667, an N-line look-up table 668, a second stage multiplier 671 and multiplexer 672 with an absolute value input multiplexer 669, and a third stage multiplier 673 and multiplexer 674 with a complex absolute value input multiplexer 670. The different Volterra terms are accumulated at an adder circuit 675 to generate a complex polynomial at the DPD output (e.g., $y[n]=y_{B1}+Y_{B2}+ \ldots +y_{BQ}$).

As will be appreciated, the DPD actuator module 600 may also include additional circuitry and connection ports for conveying inputs and/or outputs to or from other basic predistorter hardware cell units. For example, the additional circuitry may include include a K-input multiplexer (not shown) to receive and select between input complex samples (x[n]) for output to the first vector magnitude computation unit 661 and second delay line 663. In addition, the absolute value K+1 input multiplexer 669 may include an additional input port 682 for receiving an input term $C_{in}[n]$, such as a second stage (STAGE 2) output from another basic predistorter hardware cell unit. In addition, a second stage output connection line or port 683 may be provided at the output of the second stage multiplexer 672 for providing an output term $C_{out}[n]$ for possible input to another basic predistorter hardware cell unit. The second delay line 663 may also include an output connection line or port 684 for providing an output term $x_{out}[n]=x[n-K-1]$ for possible input to another basic predistorter hardware cell unit. Likewise, the shared output adder circuit 675 may be implemented as a Q+1 input adder which includes an input connection line or port 685 for receiving an input term $y_{in}[n]$, such as an output term from another basic predistorter hardware cell unit.

In operation, each basic predistorter hardware cell (e.g., BPC 601) receives absolute sample values (A[n]) from a first delay line 662 that holds the last M absolute values of the input complex samples (x[n]) and also receives complex sample values from the second delay line that holds the last M input complex samples (x[n]). In addition, each of Q identical predistorter hardware cells includes an N-line look-up table (LUT) 668 which performs linear interpolation between LUT values to decrease quantization error. Using the product of one or more absolute sample values to index into the LUT 668, the resulting LUT outputs provide product terms (e.g., β*A[n−k]) which are multiplied with additional absolute sample values (e.g., A[n−l]) and/or complex sample values (e.g., x[n−k]) using a combination of multiplier and multiplexer hardware circuits so that the output of each predistorter hardware cell may be combined at an adder circuit 675 to generate the DPD output sum (e.g., y[n]).

In the depicted DPD actuator module 600, a pair of K-input multiplexers 664, 665 (e.g., K=32:1 MUXes) provides first and second absolute sample values obtained from the first delay line 662 for multiplication at a first stage (STAGE 1) multiplier circuit 666 which performs a real number multiplication operation. The resulting product output from the first stage multiplier circuit 666 is connected to a first stage multiplexer 667 which also receives an absolute sample value from one of the input multiplexers (e.g., 664) which bypasses the multiplier circuit 666. The selected output from the first stage multiplexer 667 is supplied as an index to the LUT 668. In an example embodiment, the LUT 668 stores 128×4=512 entries with linear interpolation. In addition, the LUT 668 may provide linear interpolation between LUT values to reduce quantization error. The output from the LUT 668 is connected to a second stage (STAGE 2) multiplier circuit 671 which also receives an absolute sample value input obtained from the absolute value K-input multiplexer 669 (e.g., K=32:1 MUX). In this configuration, the second stage multiplier circuit 671 performs a half complex multiplication operation. The resulting product output from the second stage multiplier circuit 671 is connected to a second stage multiplexer 672 which also receives an output from the LUT 668 which bypasses the multiplier circuit 671. At a third stage (STAGE 3) multiplier circuit 673, the selected output from the second stage multiplexer 672 is multiplied with a complex sample value obtained from the complex absolute value K-input multiplexer 670 (e.g., K=32:1 MUX). In this configuration, the third stage multiplier circuit 673 performs a complex multiplication operation, and the output from the third stage multiplier circuit 673 is connected to a third stage (STAGE 3) multiplexer 674 which also receives an empty term or "0" input. The third stage multiplexer 674 is connected to select between the empty term and the complex multiplication output from the third stage multiplier circuit 673 for output as a first output term (e.g., $y_{B1}$) from the basic predistorter hardware cell (e.g., BPC 601). In this way, different output terms (e.g., $y_{B1}, y_{B2} \ldots y_{BQ}$) from different predistorter cells (e.g., 601-603) may be combined or added at the shared adder circuit 675 to generate the DPD output (e.g., $y[n]=y_{B1}+y_{B2}+ \ldots y_{BQ}$). For example, each of the basic predistorter hardware cells 601-603 is capable of implementing one of the following GVSA memory polynomials or first order cross terms for types 1, 2 and 3:

a. $y[n]=\Sigma\beta*A[n]^P$ (Static polynomial term)
b. $y[n]=\Sigma\beta*A[n-k]^P$ (a single memory polynomial term)
c. $y[n]=\Sigma\beta*A[n-k]^P*A[n-l]$ (a single memory $1^{st}$ order Volterra model term)
d. $y[n]=\Sigma\beta*A[n-k]^P*A[n-l]*A[n-m]$ (a single memory $2^{nd}$ order Volterra model term)
e. $y[n]=\Sigma\beta*A[n-k]^P*A[n-l]^P*A[n-m]*A[n-r]$ (a single memory $3^{rd}$ order Volterra model term)

where l, m, and r are constant delays.

To track changes in the performance of the power amplifier, the DPD actuator module 600 and DPD adaptation module 610 are connected in an indirect learning architecture for estimating and adapting the memory polynomial coefficients by providing a postdistorter in the feedback path that that first identifies the inverse characteristics of the power amplifier and then the coefficients of this postdistorter are copied to work as a predistorter. In the disclosed arrangement, the error calculation module 611 is connected to calculate or determine an error measure between the received complex samples of the input baseband signal x[n] and the digitized complex samples of the transmit signal z[n] captured in feedback from the power amplifier output. In the DPD model adaptation module 612, the error measure is used to generate predistortion model coefficients, such as by using the fixed-point conjugate gradient DPD techniques disclosed herein to find the DPD model coefficients $u_{qi}$ that minimize the equation $y_n - \sum_{q=1}^{Q} z_{n-q+1} \sum_{i=0}^{M-1} u_{qi} \phi_i(|z_{n-q+1}|)$. At the converter 613, the model coefficients are converted to LUT values for each basic predistorter hardware cell 601-603, thereby adapting all N lines in each LUT once every L samples.

Integrated within a single chip digital front end processor (e.g., 201), digital pre-distortion may be performed on a composite multi-carrier waveform using the integrated predistorter hardware cells 601-603 to perform Volterra's processing algorithm to calculate polynomial values from a complex input vector. However, it will be appreciated that the digital predistortion functionality provided is not constrained to a specific mathematical model, such as Volterra, since the LUT can represent any form of function, not only a power series model. For example, the depicted DPD actuator module 600 may be used to implement any other LUT-based function, with or without cross-correlation term multiplication, allowing for direct adaptation solutions for generating the predistortion function 'G' using curve-fitting methods, such as Secant, Newton's Discrete method, and the like. By implementing direct adaptation methods with look-up tables, the DPD actuator module 600 is not constrained to a specific mathematical model, such as Volterra, since the LUT 668 can represent any form of function, not only a power series model. Also, the ability of the DPD actuator module 600 to provide a more elaborate mathematical DPD model with more power series terms reduces the complexity of direct adaptation solutions, as compared to traditional curve-fitting methods.

In selected embodiments of the present disclosure, higher order Volterra terms can be generated by using the additional input and output ports at each predistorter hardware cell to interconnect different predistorter hardware cells into a cascaded arrangement. For example, additional input/output ports $x_{in}[n]$, $C_{in}[n]$, $C_{out}[n]$, $x_{out}[n]$, $y_{in}[n]$ may be used to cascade multiple predistorter hardware cells to evaluate higher order Volterra terms in accordance with selected embodiments of the present disclosure. For example, a single basic predistorter hardware cell unit can be configured to compute the first order cross term type 1, $\Sigma \beta_k^* X[n-k]^P * X[n-m_l] * x[n-r_l]$, and by cascading two basic predistorter hardware cell units using the additional input/output ports $x_{in}[n]$, $C_{in}[n]$, $C_{out}[n]$, $x_{out}[n]$, $y_{in}[n]$, higher order Volterra terms may be evaluated in accordance with selected embodiments of the present disclosure. In addition, other cascading arrangements may use additional input/output ports $x_{out}[n]$, $y_{in}[n]$ to achieve higher order Volterra terms in accordance with selected embodiments of the present disclosure. And with yet other cascading arrangements, the BPC blocks may be connected with additional input/output ports $x_{out}[n]$, $y_{in}[n]$, $C_{out}[n]$, $C_{in}[n]$ to achieve higher order Volterra terms. Additional details for such cascaded connections are set forth in U.S. patent application Ser. No. 14/318,000 entitled "Adaptive High-Order Nonlinear Function Approximation Using Time-Domain Volterra Series to Provide Flexible High Performance Digital Pre-Distortion" which is incorporated by reference as if fully set forth herein.

Figure 7:
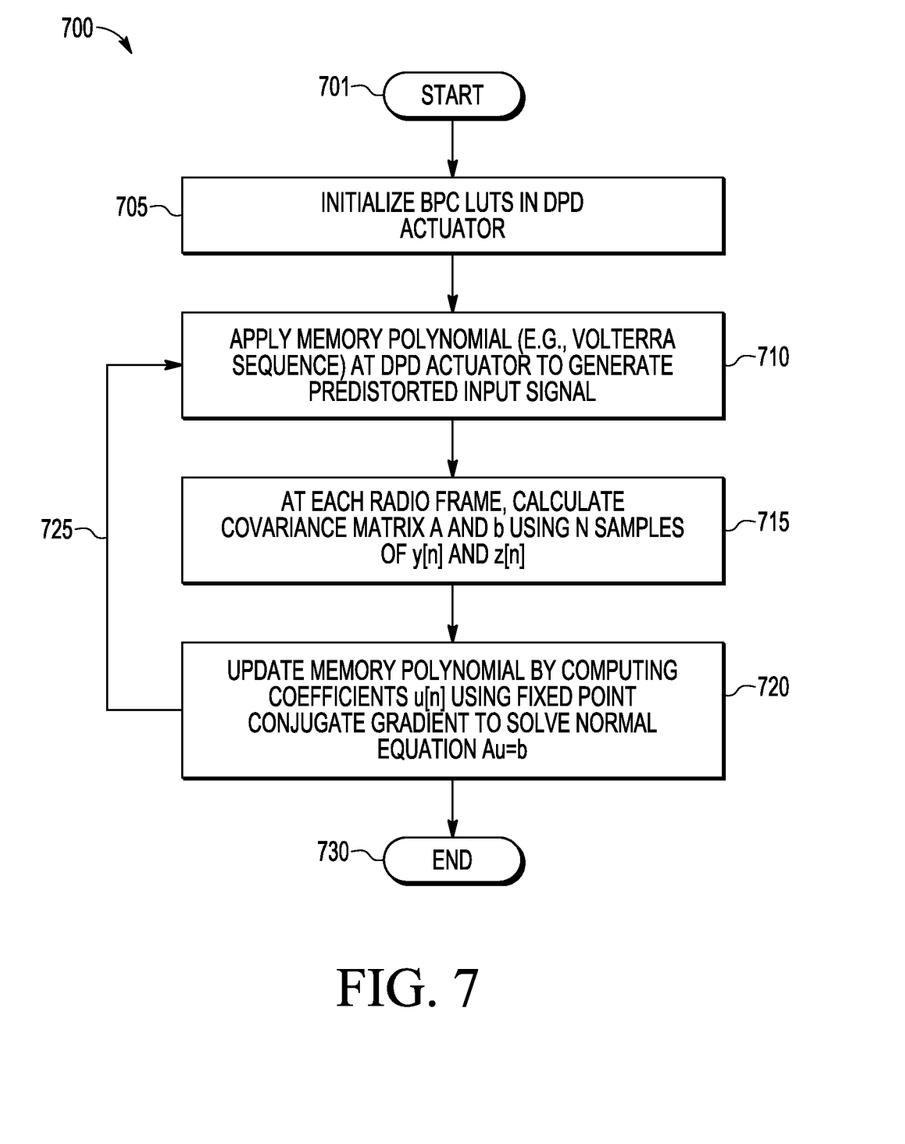

Referring now to FIG. 7, there is depicted an example flow diagram 700 of a method for computing polynomial values using a fixed-point conjugate gradient method to adaptively perform Volterra algorithm evaluation of the DPD polynomial coefficients in accordance with selected embodiments of the present disclosure. In the flow diagram 700, the method steps may be performed with a plurality of LUT-based basic predistorter cells (BPC) having a plurality of multiply/multiplex stages with cascading input/output ports which are controlled by control logic (e.g., at the DFE). The disclosed methods provide a reduced footprint, high throughput, power efficient fixed-point conjugate gradient DPD adaptation mechanism for processing absolute or magnitude values from a complex input vector and complex polynomial coefficient values to evaluate the complex polynomial against the complex input vector, such as by finding the root(s) of the complex polynomial using Volterra's method.

Once the method starts at step 701, look-up tables at each BPC in the DPD actuator are initialized or loaded at step 705 with input values for computation of the desired Volterra terms. For example, one or more first BPCs with a static look-up table ($LUT_{MEM}$) are loaded with a first coefficient set to evaluate one or more static or memory-less Volterra series terms $y_S[n]$. In addition, one or more second BPCs with a memory look-up table ($LUT_{MEM}$) are loaded with a second coefficient set that is used to evaluate one or more memory polynomial Volterra series terms $y_M[n]$. Finally, one or more cascaded BPCs with cross-term look-up tables ($LUT_{CROSS1}$, $LUT_{CROSS2}$, $LUT_{CROSS3}$) are loaded with dynamic pre-equalizing filtering coefficients $C_{qp}$, $C_{qrp}$ to evaluate dynamic memory cross-terms $y_{C1}[n]$, $y_{C2}[n]$, $y_{C3CA}[n]$.

At step 710, the individual Volterra series terms are calculated at the initialized BPCs and combined into a sequence to form a memory polynomial for the DPD actuator which is applied to the input signal x[n] to generate a predistorted input signal y[n]. At this point, the digital predistortion hardware uses the plurality of LUT-based BPCs connected on various cascade arrangements to compute not only static polynomial terms $y_S[n]$ and memory polynomial terms $y_M[n]$, but also higher order cross-terms, including first and second order dynamic memory cross-terms $y_{C1}[n]$, $y_{C2}[n]$, $y_{C3}[n]$. For example, a static polynomial term $y_S[n]$ may be calculated at a first BPC as a function of the static pre-equalizing filtering coefficients $S_p$ and input complex sample values x[n], while a memory polynomial term $y_M[n]$ may be calculated at a second BPC as a function of the dynamic pre-equalizing filtering coefficients $M_{qp}$ and input complex sample values x[n]. In addition, one or more cross-terms—such as type 1 cross-term $y_{CT1}[n]$, type 2 cross-terms $y_{CT2}[n]$, or type 3 cross-term $y_{CT3}[n]$—may be calculated at one or more cascaded BPCs as a function of the dynamic pre-equalizing filtering coefficients $C_{CT}$ and input complex sample values x[n].

At step 715, the DPD adaptation process begins by updating the memory polynomial(s) in the DPD actuator every predetermined interval (e.g. each radio frame) by using N received samples of the predistorted signal y[n] and the captured feedback output captured from the transmit power amplifier z[n] to calculate the covariance matrix A and b. With the captured y[n] and z[n] values, a fixed-point conjugate gradient solution may be executed at step 720 to initialize and process selected computational CG parameters to compute selected pre-equalizing filtering coefficients u[n] which solve the normal equation, Au=b. In selected embodiments, the pre-equalizing filtering coefficients u[n] may be computed by using control code functionality that is executed by a fixed-point DSP or embodied in hardware to initialize selected computational CG parameters, such as by specifying or defining an initial solution (u=u_init), an initial output value b=average(z(0)·A·y(0)), an initial search direction value v=b−A·u, an initial residual value r=v, and an initial residual magnitude value ω=v'·v. Using the initialized computational CG parameters, the pre-equalizing filtering coefficients may be computed for the memory polynomial by calculating the scalar CG parameter $\alpha=(r'\cdot v)/(v'\cdot A\cdot v)$, the previous residual value r_prev=r, the updated residual value $r=r-\alpha\cdot A\cdot v$, the scalar CG parameter $\beta=(r'\cdot r-\text{real}(r\_prev'\cdot r))/\omega$, the updated output value $\omega=r'\cdot r$, the updated search direction value $v=r+\beta\cdot v$, and the updated pre-equalizing filtering coefficient solution value $u=u+\alpha\cdot v$. By supplying the pre-equalizing filtering coefficients u[n] to the DPD actuator (as indicated by feedback line 725), the memory polynomial at the DPD actuator may be updated with the updated pre-equalizing filtering coefficients u[n], enabling the DPD actuator hardware to adaptively generate the updated predistorted input signal y[n] by adding the individual Volterra sequence at step 710. In this way, the digital predistortion hardware operates in parallel to adaptively calculate individual Volterra terms with pipelining of the BPC operations to simultaneously evaluate a complex polynomial against different values from a complex input vector. At step 730, the method ends.

As disclosed herein, the system, apparatus, and methodology for evaluating a polynomial with a flexible, high performance, and efficient digital predistortion hardware provides a fixed-point DSP or DPD accelerator hardware approach for adaptively updating the memory polynomials used for pre-correction processing in one or more cascaded DPD actuators which are used to compute Volterra series memory polynomial terms and cross terms of type 1, 2 and 3 based on look-up table (LUT) implementation in single memory. By providing a fixed-point conjugate gradient iterative computation solution for updating the memory polynomial coefficients used in the disclosed DPD actuator arrangement of LUT-based basic predistorter cells, changes in the power amplifier performance can be tracked with a smaller, low cost, and efficient solution having reduced hardware complexity with reduced sampling frequencies and shorter adaptation times, thereby achieving improved power amplifier performance (i.e., lower adjacent channel power carrier leakage and higher output power efficiency) with lower cost and complexity. However, it will be appreciated that the disclosed fixed-point DPD adaptation algorithm and associated computational CG parameters used in the arrangement of LUT-based basic predistorter cells connected and/or cascaded together may also be used for general purpose adaptive mathematical approximation and modeling of nonlinear processes, and not just evaluation of Volterra series terms. Thus, the description provided herein with reference to a digital front end circuit having DPD processing is provided as an example embodiment, and it will be appreciated that the embodiments disclosed herein relate more broadly to an adaptive high-order nonlinear function approximation using time-domain Volterra series. Thus, other complex multi-purpose non-linear function structures may be implemented to provide different types of Volterra series implementations and selectable orders of approximation, such as memory polynomials, Volterra-series terms with dynamic deviation reduction, cross-term polynomials, generalized memory polynomials, etc.). In addition, the disclosed arrangement of multiple BPC blocks enables a scalable number of channels to be supported by computing different nonlinear functions in parallel at the multiple BPC blocks, thereby increasing throughput and efficiency. The inclusion of look-up tables in each basic predistorter cell also enables real-time programmability and configuration of the nonlinear functions provided by the digital predistortion hardware so that the definition and structural operation of the hardware may be changed on demand. For example, as an application needs more complex approximation, the additional BPCs may be engaged.

The BPC hardware is also suitable for high-speed and computationally intensive SoC applications. The BPC structure provides design opportunities for high frequency clocking. The design can be implemented as optimized and hardened core, which is later used in application-specific SoC realizations with customized interconnect in the upper levels of the layout hierarchy.

As will be appreciated, the disclosed mechanism, system and methodology described herein for using adaptive digital predistortion hardware with cascaded LUT-based basic predistorter cells to efficiently evaluate complex polynomials against a complex input vector may be embodied in hardware as a plurality of multiply/multiplex stages with storage flop devices for holding intermediate computation results for different complex input vector values. However, selected aspects of the digital predistortion hardware functionality may be programmed or loaded by processing circuitry (e.g., a field-programmable gate array) executing software (e.g., in a processor or a controller including but not limited to firmware, resident software, microcode, etc.). Any such programming operation may be embodied in whole or in part as a computer program product accessible from a computer-usable or computer-readable medium providing program code for use by or in connection with a computer or any instruction execution system, where a computer-usable or computer readable medium can be any apparatus that may include, store, communicate, propagate, or transport the program for use by or in connection with the instruction execution system, apparatus, or device. Examples of a computer-readable medium include a semiconductor or solid state memory, magnetic tape, a removable computer diskette, a random access memory (RAM), a read-only memory (ROM), a rigid magnetic disk, USB memory stick, and an optical disk, such as a compact disk-read only memory (CD-ROM), compact disk-read/write (CD-R/W), DVD, and the like.

By now it should be appreciated that there has been provided a circuit, method and system for predistorting an input signal to compensate for non-linearities of an electronic device that operates on the input signal to produce an output signal, such as may be used by performing digital pre-distortion in a base station having a radio frequency (RF) communication signal path and transceiver front end. In the disclosed methodology, there is provided an input at an input of a digital predistortion actuator for receiving a first input signal as a plurality of input signal samples x[n] to be transmitted over a non-linear electronic device. In selected embodiments, the input may be connected to receive the first input signal as IQ baseband input signal samples from the baseband modem. At the digital predistortion actuator, a memory polynomial having a first set of pre-equalizing filtering coefficients is applied to generate a first pre-distorted input signal which is provided to the non-linear electronic device to produce the output signal. To apply the memory polynomial, the digital predistortion actuator is provided as one or more digital predistortion blocks coupled to the input for generating the first pre-distorted input signal by adaptively modifying the first input signal to compensate for distortion effects in the non-linear electronic device. To this end, each digital predistortion block includes a first delay line, a second delay line, a plurality of Q predistorter cells, and an output adder circuit. The first delay line stores a first plurality of input signal samples x[n], while the second delay line stores a first plurality of amplitude samples A[n] derived from the first plurality of signal samples x[n]. For example, the first delay line may hold K complex signal samples, while the second delay line may hold K absolute values of the K complex signal samples. In addition, each of the Q predistorter cells includes an input stage for combining amplitude samples received from the second delay line into a first stage output, a lookup table (LUT) connected to be addressed by the first stage output for generating an LUT output, and one or more output multiplication stages for combining the LUT output with signal samples and amplitude samples received from the first and second delay lines to generate an output signal sample $y_Q$ from said predistorter cell. In each predistorter cell, the LUT may be initialized by programmably storing LUT entries with the first set of pre-equalizing filtering coefficients so that the LUT provides linear interpolation between LUT entries. The output adder circuit is connected to combine the output signal samples $y_Q$ from the plurality of Q predistorter cells into a combined signal which is processed to generate the first pre-distorted input signal for transmission to the non-linear electronic device. In the disclosed methodology, a digital predistortion adapter computes a second set of pre-equalizing filtering coefficients with an iterative fixed-point conjugate gradient method which uses N received digital samples of the first pre-distorted input signal and N received digital samples captured from the output signal to process a set of conjugate gradient parameters every predetermined interval (e.g., each radio frame). In selected embodiments, the second set of pre-equalizing filtering coefficients are computed by retrieving input data defining a matrix A and a vector b, and then processing the input data in accordance with an iterative conjugate gradient method to generate data defining a solution vector u of the second set of pre-equalizing filtering coefficients for a linear system represented by Au=b, wherein data items processed by the digital predistortion adapter, corresponding to vectors used in said iterative conjugate gradient method, have a fixed-point data format. For example, the computation of the second set of pre-equalizing filtering coefficients may be implemented by generating an initialized set of conjugate gradient parameters based on the N received digital samples of the first pre-distorted input signal and N received digital samples captured from the output signal; computing one or more scalar conjugate gradient parameters having a dynamic range that is suitable for fixed-point arithmetic; and processing the initialized set of conjugate gradient parameters and the one or more scalar conjugate gradient parameters to update selected conjugate gradient parameters, thereby generating the second set of pre-equalizing filtering coefficients. In selected embodiments, the initialized set of conjugate gradient parameters may be generated by defining an initial solution u=u_init, an initial output value b=average(z(0)·A·y (0)), an initial search direction value v=b−A·u, an initial residual value r=v, and an initial residual magnitude value ω=v'·v. In addition, the one or more scalar conjugate gradient parameters may be computed by calculating a first scalar conjugate gradient parameter α=(r'·v)/(v'·A·v), a previous residual value r_prev=r, an updated residual value r=r−α·A·v, and a second scalar conjugate gradient parameter β=(r'·r·real(r_prev'·r))/ω. Finally, the initialized set of conjugate gradient parameters and the one or more scalar conjugate gradient parameters may be processed by calculating an updated residual magnitude value ω=r'·r, updated search direction value v=r+β·v, and updated pre-equalizing filtering coefficient solution value u=u+α·v. Finally, the first set of pre-equalizing filtering coefficients may be updated with the second set of pre-equalizing filtering coefficients to adaptively modify the memory polynomial applied at the digital predistortion actuator to generate a second pre-distorted input signal which is provided to the non-linear electronic device to produce the output signal.

In another form, there is provided a predistorter having a digital predistorter actuator and digital predistortion adapter which are operative predistort an input signal for transmission over an amplifier. As disclosed, the digital predistortion actuator is connected to receive a first input signal having a plurality of input signal samples to be transmitted over the amplifier, and is configured to predistort the first input signal by applying a memory polynomial comprising a first set of pre-equalizing filtering coefficients to generate a first pre-distorted input signal which is provided to the amplifier to produce an amplified output signal. The disclosed digital predistortion adapter is connected to receive input data comprising N received digital samples of the first pre-distorted input signal and N received digital samples captured from the amplified output signal. Using the input data to process a set of conjugate gradient parameters at predetermined intervals (e.g., radio frame) of the input signal, the digital predistortion adapter computes a second set of pre-equalizing filtering coefficients with an iterative fixed-point conjugate gradient algorithm. In selected embodiments, the digital predistortion adapter is embodied as a fixed-point digital signal processor, while in other embodiments, the digital predistortion adapter is embodied as accelerator hardware for digital predistortion adaptation. For example, the digital predistortion adapter may be configured to compute the second set of pre-equalizing filtering coefficients by processing an input matrix A and an input vector b in accordance with an iterative conjugate gradient method to generate data defining a solution vector u of the second set of pre-equalizing filtering coefficients for a linear system represented by Au=b, wherein data items processed by the digital predistortion adapter, corresponding to vectors used in said iterative conjugate gradient method, have a fixed-point data format. Alternatively, the digital predistortion adapter may be configured to compute the second set of pre-equalizing filtering coefficients by generating an initialized set of conjugate gradient parameters based on the input data; computing one or more scalar conjugate gradient parameters having a dynamic range that is suitable for fixed-point arithmetic; and processing the initialized set of conjugate gradient parameters and the one or more scalar conjugate gradient parameters to update selected conjugate gradient parameters, thereby generating the second set of pre-equalizing filtering coefficients. Finally, the digital predistortion adapter is connected to update the first set of pre-equalizing filtering coefficients in the digital predistortion actuator with the second set of pre-equalizing filtering coefficients to adaptively modify the memory polynomial applied at the digital predistortion actuator to generate a second pre-distorted input signal which is provided to the amplifier.

In yet another form, there is provided a system and method for predistorting an input signal. As disclosed, the system includes a sampling block unit for storing a block of input signal samples from an input signal. In addition, the system includes a digital pre-distortion circuit connected in a transmission path between the sampling block unit and a transmission circuit (e.g., power amplifier) to generate a first pre-distorted input signal by applying a memory polynomial comprising a first set of pre-equalizing filtering coefficients. The system also includes a feedback circuit (e.g., an analog-to-digital converter) coupled to the output of the transmission circuit for providing feedback signal from the output of the transmission circuit. Finally, the system includes a digital pre-distortion adaptation module coupled to receive the first pre-distorted input signal and feedback signal and compute therefrom a second set of pre-equalizing filtering coefficients with an iterative fixed-point conjugate gradient algorithm using the first pre-distorted input signal and feedback signal to process a set of conjugate gradient parameters at predetermined intervals (e.g., radio frame) of the input signal. In selected embodiments, the digital pre-distortion adaptation module is embodied as a fixed-point digital signal processor, while in other embodiments, the digital pre-distortion adaptation module is embodied as accelerator hardware for digital predistortion adaptation. In selected embodiments, the digital pre-distortion adaptation module computes the second set of pre-equalizing filtering coefficients with an iterative fixed-point conjugate gradient method which uses N received digital samples of the first pre-distorted input signal and N received digital samples of the feedback signal to process a set of conjugate gradient parameters at each predetermined interval. With the digital pre-distortion adaptation module connected to the digital pre-distortion circuit, the first set of pre-equalizing filtering coefficients may be updated with the second set of pre-equalizing filtering coefficients to adaptively modify the memory polynomial applied at the digital pre-distortion circuit to generate a second pre-distorted input signal which is provided to the transmission circuit device to produce an output signal.

Although the described exemplary embodiments disclosed herein are directed to fixed-point DSP or hardware-based methods and systems for adaptively evaluating higher order Volterra series terms, the present invention is not necessarily limited to the example embodiments illustrate herein, and various embodiments of the circuitry and methods disclosed herein may be implemented with other devices and circuit components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for predistorting an input signal, comprising:
   receiving, at an input of a digital predistortion actuator, a first input signal comprising a plurality of input signal samples to be transmitted over a non-linear electronic device;
   applying, at the digital predistortion actuator, a memory polynomial comprising a first set of pre-equalizing filtering coefficients to generate a first pre-distorted input signal which is provided to the non-linear electronic device to produce an output signal;
   computing, at a digital predistortion adapter, a second set of pre-equalizing filtering coefficients with an iterative fixed-point conjugate gradient method by:
      generating an initialized set of conjugate gradient parameters based on N received digital samples of the first pre-distorted input signal and N received digital samples captured from the output signal by defining an initial solution u=u_init for the second set of pre-equalizing filtering coefficients and initializing an initial output value b=average(z(0)·A·y(0)), an initial search direction value v=b−A·u, an initial residual value r=v, and an initial residual magnitude value ω=v'·v, where z(0) is a first output signal value, A is a covariance matrix, and y(0) is a first pre-distorted input signal value,
      computing one or more scalar conjugate gradient parameters having a dynamic range that is suitable for fixed-point arithmetic, and
      processing the initialized set of conjugate gradient parameters and the one or more scalar conjugate gradient parameters to update selected conjugate gradient parameters, thereby generating the second set of pre-equalizing filtering coefficients; and
   updating the first set of pre-equalizing filtering coefficients with the second set of pre-equalizing filtering coefficients to adaptively modify the memory polynomial applied at the digital predistortion actuator to generate a second pre-distorted input signal which is provided to the non-linear electronic device to produce the output signal.

2. The method of claim 1, where receiving the first input signal comprises receiving IQ baseband input signal samples from a baseband modem at the input of the digital predistortion actuator.

3. The method of claim 1, where applying the memory polynomial comprises:
   providing the digital predistortion actuator as one or more digital predistortion blocks coupled to the input and generating the first pre-distorted input signal by adaptively modifying the first input signal to compensate for distortion effects in the non-linear electronic device, each digital predistortion block comprising:
- a first delay line for storing a first plurality of input signal samples x[n];
- a second delay line for storing a first plurality of amplitude samples A[n] derived from the first plurality of input signal samples x[n];
- a plurality of Q predistorter cells, each comprising an input stage for combining amplitude samples received from the second delay line into a first stage output, a lookup table (LUT) connected to be addressed by the first stage output for generating an LUT output, and one or more output multiplication stages for combining the LUT output with signal samples and amplitude samples received from the first and second delay lines to generate an output signal sample $y_Q$ from said predistorter cell; and
- an output adder circuit connected to combine the output signal samples $y_Q$ from the plurality of Q predistorter cells into a combined signal; and processing the combined signal to generate the first pre-distorted input signal for transmission to the non-linear electronic device.

4. The method of claim 3, where providing the digital predistortion actuator as one or more digital predistortion blocks comprises initializing each LUT by programmably storing LUT entries with the first set of pre-equalizing filtering coefficients.

5. The method of claim 1, where computing the second set of pre-equalizing filtering coefficients comprises:
- retrieving input data defining a matrix A and a vector b; and
- processing the input data in accordance with the iterative fixed-point conjugate gradient method to generate data defining a solution vector u of the second set of pre-equalizing filtering coefficients for a linear system represented by Au=b, wherein data items processed by the digital predistortion adapter, corresponding to vectors used in said iterative conjugate gradient method, have a fixed-point data format.

6. The method of claim 1, where computing one or more scalar conjugate gradient parameters comprises calculating a first scalar conjugate gradient parameter $\alpha=(r'\cdot v)/(v'\cdot A\cdot v)$, a previous residual value r_prev=r, an updated residual value $r=r-\alpha\cdot A\cdot v$, and a second scalar conjugate gradient parameter $\beta=(r'\cdot r-\text{real}(r\_prev'\cdot r))/\omega$.

7. The method of claim 6, where processing the initialized set of conjugate gradient parameters and the one or more scalar conjugate gradient parameters comprises calculating an updated residual magnitude value $\omega=r'\cdot r$, updated search direction value $v=r+\beta\cdot v$, and updated pre-equalizing filtering coefficient solution value $u=u+\alpha\cdot v$.

8. A predistorter for predistorting an input signal for transmission over an amplifier, comprising:
- a digital predistortion actuator connected to receive a first input signal comprising a plurality of input signal samples to be transmitted over the amplifier and configured to predistort the first input signal by applying a memory polynomial comprising a first set of pre-equalizing filtering coefficients to generate a first pre-distorted input signal which is provided to the amplifier to produce an amplified output signal; and
- a digital predistortion adapter connected to receive input data comprising N received digital samples of the first pre-distorted input signal and N received digital samples captured from the amplified output signal, where the digital predistortion adapter computes a second set of pre-equalizing filtering coefficients with an iterative fixed-point conjugate gradient algorithm using the input data to process a set of conjugate gradient parameters at predetermined intervals of the input signal by:
  - generating an initialized set of conjugate gradient parameters based on the N received digital samples of the first pre-distorted input signal and the N received digital samples captured from the output signal by defining an initial solution u=u_init for the second set of pre-equalizing filtering coefficients and initializing an initial output value b=average(z(0)·A·y(0)), an initial search direction value v=b−A·u, an initial residual value r=v, and an initial residual magnitude value $\omega=v'\cdot v$, where z(0) is a first output signal value, A is a covariance matrix, and y(0) is a first pre-distorted input signal value,
  - computing one or more scalar conjugate gradient parameters having a dynamic range that is suitable for fixed-point arithmetic, and
  - processing the initialized set of conjugate gradient parameters and the one or more scalar conjugate gradient parameters to update selected conjugate gradient parameters, thereby generating the second set of pre-equalizing filtering coefficients;
- where the digital predistortion adapter is connected to update the first set of pre-equalizing filtering coefficients in the digital predistortion actuator with the second set of pre-equalizing filtering coefficients to adaptively modify the memory polynomial applied at the digital predistortion actuator to generate a second pre-distorted input signal which is provided to the amplifier.

9. The predistorter of claim 8, where the digital predistortion adapter comprises a fixed-point digital signal processor.

10. The predistorter of claim 8, where the digital predistortion adapter comprises accelerator hardware for digital predistortion adaptation.

11. The predistorter of claim 8, where the digital predistortion actuator comprises one or more digital predistortion blocks connected to receive the first input signal and to generate the first pre-distorted input signal by adaptively modifying the first input signal to compensate for distortion effects in the amplifier, each digital predistortion block comprising:
- a first delay line for storing a first plurality of input signal samples x[n];
- a second delay line for storing a first plurality of amplitude samples A[n] derived from the first plurality of input signal samples x[n];
- a plurality of Q predistorter cells, each comprising an input stage for combining amplitude samples received from the second delay line into a first stage output, a lookup table (LUT) connected to be addressed by the first stage output for generating an LUT output, and one or more output multiplication stages for combining the LUT output with signal samples and amplitude samples received from the first and second delay lines to generate an output signal sample $y_Q$ from said predistorter cell; and
- an output adder circuit connected to combine the output signal samples $y_Q$ from the plurality of Q predistorter cells into a combined signal.

12. The predistorter of claim 8, where the digital predistortion adapter is configured to compute the second set of pre-equalizing filtering coefficients by processing an input matrix A and an input vector b in accordance with the iterative fixed-point conjugate gradient method to generate data defining a solution vector u of the second set of pre-equalizing filtering coefficients for a linear system represented by Au=b, wherein data items processed by the digital predistortion adapter, corresponding to vectors used in said iterative conjugate gradient method, have a fixed-point data format.

13. The predistorter of claim 8, where computing one or more scalar conjugate gradient parameters comprises calculating a first scalar conjugate gradient parameter $\alpha=(r'\cdot v)/(v'\cdot A\cdot v)$, a previous residual value r_prev=r, an updated residual value $r=r-\alpha\cdot A\cdot v$, and a second scalar conjugate gradient parameter $R=(r'\cdot r-\text{real}(r\_prev'\cdot r))/\omega$.

14. A system, comprising:
   a memory storage device for storing a block of input signal samples from an input signal;
   a digital pre-distortion circuit connected in a transmission path between the memory storage device and a transmission circuit to generate a first pre-distorted input signal by applying a memory polynomial comprising a first set of pre-equalizing filtering coefficients;
   a feedback circuit coupled to the output of the transmission circuit for providing feedback signal from the output of the transmission circuit; and
   a digital pre-distortion adapter coupled to receive the first pre-distorted input signal and feedback signal and compute therefrom a second set of pre-equalizing filtering coefficients with an iterative fixed-point conjugate gradient algorithm using the first pre-distorted input signal and feedback signal to process a set of conjugate gradient parameters at predetermined intervals of the input signal by:
      generating an initialized set of conjugate gradient parameters based on N received digital samples of the first pre-distorted input signal and N received digital samples captured from the output signal by defining an initial solution u=u_init for the second set of pre-equalizing filtering coefficients and initializing an initial output value $b=\text{average}(z(0)\cdot A\cdot y(0))$, an initial search direction value $v=b-A\cdot u$, an initial residual value $r=v$, and an initial residual magnitude value $\omega=v'\cdot v$, where z(0) is a first output signal value, A is a covariance matrix, and y(0) is a first pre-distorted input signal value,
      computing one or more scalar conjugate gradient parameters having a dynamic range that is suitable for fixed-point arithmetic, and
      processing the initialized set of conjugate gradient parameters and the one or more scalar conjugate gradient parameters to update selected conjugate gradient parameters, thereby generating the second set of pre-equalizing filtering coefficients;
   where the digital pre-distortion adapter is connected to update the first set of pre-equalizing filtering coefficients in the digital pre-distortion circuit with the second set of pre-equalizing filtering coefficients to adaptively modify the memory polynomial applied at the digital pre-distortion circuit to generate a second pre-distorted input signal which is provided to the transmission circuit device to produce an output signal.

15. The system of claim 14, where computing one or more scalar conjugate gradient parameters comprises calculating a first scalar conjugate gradient parameter $\alpha=(r'\cdot v)/(v'\cdot A\cdot v)$, a previous residual value r_prev=r, an updated residual value $r=r-\alpha\cdot A\cdot v$, and a second scalar conjugate gradient parameter $\beta=(r'\cdot r-\text{real}(r\_prev'\cdot r))/\omega$, and where processing the initialized set of conjugate gradient parameters and the one or more scalar conjugate gradient parameters comprises calculating an updated residual magnitude value $\omega=r'\cdot r$, updated search direction value $v=r+\beta\cdot v$, and updated pre-equalizing filtering coefficient solution value $u=u+\alpha\cdot v$.

16. The system of claim 14, where the transmission circuit comprises a power amplifier and where the feedback circuit comprises an analog-to-digital converter.

17. The predistorter of claim 14, where the digital pre-distortion adapter comprises a fixed-point digital signal processor.

18. The predistorter of claim 14, where the digital pre-distortion adapter comprises accelerator hardware for digital predistortion adaptation.

* * * * *